Patented Nov. 30, 1943

2,335,707

UNITED STATES PATENT OFFICE 2,335,707

THERMOCOUPLE WIRE

Johann S. Streicher, Newark, N. J., assignor to The American Platinum Works, Newark, N. J., a corporation of New Jersey No Drawing. Application June 21, 1941, Serial No. 399,236

3 Claims. (Cl. 136—5)

This invention relates to electrical resistance wires in general and is concerned in particular with wires for thermocouples for thermoelectric pyrometers. Precious metal thermocouples comprise usually a negative wire of platinum fused at one end to a positive wire of an alloy of 90% platinum and 10% rhodium, wherein heat applied to the fused junction or hot end sets up an electromotive force, the voltage generated being proportional to the temperature gradient between the hot end and the cold end. Precious metal resistance pyrometers usually comprise a wire of platinum serving as an electrical resistance wire, the resistance of which varies with variations in the ambient temperature.

Such wires of such temperature measuring instruments are frequently exposed to substances containing corrosive gases or other materials. In such circumstances the platinum wire deteriorates relatively quickly, particularly when reducing conditions exist under which the pure platinum acts at elevated temperatures as a very efficient getter towards minute traces of certain chemically active gases or substances, thereby absorbing detrimental impurities which cause cracks and the like in the fine platinum wire and change the E. M. F. thereof. Such getter action or association takes place predominantly along the edges of platinum crystals and follows the crystalline boundaries thereof causing sudden intercrystalline cracks which prematurely terminate the usefulness of such wires. Also, it has been observed that the fine wires of platinum sometimes lack sufficient tensile and other mechanical strength.

It is one object of my invention to provide an electrical resistance wire which shall have excellent chemical stability under oxidizing as well as under reducing conditions, and which shall have great mechanical strength. It is another object of my invention to provide a precious metal thermocouple wire which shall have the aforesaid advantageous properties in regard to chemical stability and mechanical strength. It is a still further object of my invention to provide thermocouple and the like wire capable of maintaining its E. M. F. value over extended periods of time without substantial change affecting the effective usefulness of such wire. Other objects of my invention will be apparent from the description of my invention hereinafter following.

In the manufacture of thermocouple and the like platinum wire chemically pure (C. P.) platinum is generally used, i. e., platinum refined to a purity of 99.999% conforming with the specification of the Bureau of Standards. The platinum-rhodium alloy of 90% platinum and 10% rhodium as used in thermocouples shows an E. M. F. against C. P. platinum of 10.72 millivolts at 1100° C., 11.92 millivolts at 1200° C., and 14.38 millivolts at 1400° C. The thermocouple comprising a wire of C. P. platinum and a wire of an alloy of 90% platinum and 10% rhodium is connected to a galvanometer, and the pyrometric readings indicate the temperatures existing at the hot junction.

I have found that thermocouple wires of platinum can be improved and that the deficiencies of such wires as hereinabove stated can be eliminated by alloying with the platinum a small proportion of gold whereby I obtain an electrical resistance wire, and in particular thermocouple wire, of greater mechanical strength and stability combined with great ductility and workability, and especially of great chemical stability towards chemically active substances, such for example as gases or fumes, present in the surrounding medium. The improved properties of my new wire are obtained by incorporating in the platinum as little as 0.2% but not in excess of about 6% gold.

Chemically pure platinum develops an E. M. F. of zero millivolts against equal chemically pure platinum. The other five metals of the group of platinum metals, i. e., palladium, rhodium, iridium, ruthenium and osmium, and other metals such as nickel, iron, cobalt, molybdenum, tungsten, tantalum, rhenium, etc., produce when added to pure platinum a positive E. M. F. deflection against C. P. platinum. In the case of gold, however, added to platinum, the postive E. M. F. deflection toward C. P. platinum is observed only with small amounts of gold, and the deflection is such that at first it increases slightly and then decreases with increasing amounts of gold added until finally the deflection reaches zero and then becomes increasingly negative. The zero E. M. F. point is reached with less gold the purer the state of the platinum to which it is alloyed, and conversely it requires more gold to reach the zero E. M. F. point the more the platinum contains other metals producing a positive E. M. F. deflection. Thus, I may produce a wire for the purposes stated consisting of platinum alloyed with one or more metals, for instance palladium or rhodium, producing a positive E. M. F. deflection and alloyed with gold in such amount that the E. M. F. developed by the wire against C. P. platinum is exactly zero or is of any particular value which may be desired.

I can thus control the E. M. F. value of my platinum wire irrespective of any impurities tending as such to produce a positive E. M. F. deflection, or I may add specific metals, for instance palladium or rhodium, to the platinum for the purpose of obtaining specific desired objectives, such as lower price or greater corrosion resistance, or different electrical resistance, and then adjust the E. M. F. deflection to the desired value by the addition of a corresponding quantity of gold. Such control of the E. M. F. to a definite desired value can be applied to negative thermocouple wires as well as to positive thermocouple wires, by adding the necessary amount of gold to the construction material thereof whether platinum or alloy of platinum.

The amount of gold required to produce a zero E. M. F. deflection toward C. P. platinum depends, as pointed out previously, on the degree of positive E. M. F. deflection to be overcome. Thus platinum showing an E. M. F. of about 0.2 millivolt at 1200° C. toward C. P. platinum requires about 0.4% gold to result in an alloy showing no E. M. F. deflection toward C. P. platinum, whereas platinum producing a like E. M. F. deflection of about 1 millivolt requires about 1.2% gold to result in an alloy showing no E. M. F. deflection toward C. P. platinum. For instance, with platinum of a positive E. M. F. of 0.280 millivolt at 1200° C. against C. P. platinum, the alloying of 0.417% gold thereto completely balances such positive E. M. F. deflection. The temperature coefficient of electrical resistance of such alloy thus produced is $0.00361_7$ compared with a coefficient of $0.00039_2$ for C. P. platinum.

Some of the properties of the wires according to my invention are exemplified in the following tables. Table I represents experiments with thermocouple wires consisting of platinum-gold alloys obtained by alloying various amounts of gold with platinum having a positive E. M. F. of 0.800 millivolt at 1100° C. against C. P. platinum, whereas Table II represents experiments with thermocouple wires consisting of platinum-gold alloys obtained by alloying various amounts of gold with highly refined platinum having a positive E. M. F. of only 0.280 millivolt at 1200° C. against C. P. platinum.

Table I

| Alloy | E. M. F. millivolts against C. P. Pt at 1100° C. | Tensile strength after 1 hr. anneal at 1000° C. | Elongation | Electrical resistance at 25° C. |
|---|---|---|---|---|
| | | Kg./sq. mm. | Per cent | Ohms/m/ sq. mm. |
| Pt with 1% Au | +0.275 | 22.7 | 14.0 | $0.126_3$ |
| Pt with 3% Au | −0.980 | 29.6 | 14.6 | $0.151_7$ |
| Pt with 5% Au | −1.990 | 40.9 | 11.1 | $0.177_9$ |

Table II

| Alloy | Hardness after 1 hr. anneal at 950° C. Brinell, 7.5 mm. ball and a load of 281.5 kg. | E. M. F.—microvolts against C. P. platinum at— | | | |
|---|---|---|---|---|---|
| | | 900° C. | 1,000° C. | 1,100° C. | 1,200° C. |
| Pt with 0.30 Au | 33.9 | +47 | +52 | +56 | +59 |
| Pt with 0.417 Au | 36.9 | +1 | −1 | −2 | −3 |
| Pt with 0.57 Au | 71.3 | −59 | −67 | −77 | −81 |
| Pt with 1.18 Au | 82.1 | −324 | −365 | −404 | −438 |
| Pt with 3.66 Au | 89.1 | −1,300 | −1,480 | −1,620 | −1,790 |

The wires according to my invention possess greater mechanical strength and enjoy greater tensile strength than like wires of platinum, and at the same time possess greater ductility and workability. Insofar as the mechanical properties of the alloys for the wires according to this invention are concerned, an improvement over wires of platinum is observed only with 0.5% gold and more, and the degree of such improvement increases practically in direct proportion to the gold content. Thus, for instance, a wire consisting of platinum alloyed with 0.6% gold has a tensile strength of about 22 kg. per sq. mm. after annealing for 1 hr. at 1000° C., compared with a tensile strength of only 16 kg. per sq. mm. for C. P. platinum similarly annealed, whereas a wire consisting of platinum alloyed with 5% gold possesses a tensile strength of about 41 kg. per sq. mm. after a like annealing treatment.

The wires according to my invention have proved to have great chemical stability towards chemically active substances, such as fumes of silicium, phosphorus, and detrimental metal fumes, encountered in the use of thermocouple or the like wires, whether used under oxidizing or neutral or reducing conditions, and they are less likely, therefore, to develop cracks or otherwise deteriorate in use than are wires of platinum as such. The improvement in chemical stability over like wires of platinum is noted already with gold in amounts as small as 0.2%. The crystal grains of the construction material of my new resistance wires are extremely small. Furthermore, the wires possess great ruggedness with respect to constancy in E. M. F. values even when subjected to elevated temperatures for extended periods of time. The diameter of the wires according to my invention may vary within wide limits depending on the particular use thereof. Thermocouple wires, for instance, may vary in diameter from 0.005″ to about 0.045″. In other uses, as for instance wires for resistance pyrometers or resistance wires in gas analysis apparatus, the diameter of the wires may vary from 0.001″ to 0.003″.

The resistance wires, in particular thermocouple wires, according to my invention, have, therefore, high mechanical and chemical stability combined with excellent workability. The E. M. F. values of such wires are highly constant. The wires may consist of substantially binary alloys of platinum and gold or of non-binary alloys of platinum with gold and other metals. In all cases the E. M. F. value can be controlled, and in particular I would recommend for negative thermocouple wires such wires wherein the E. M. F. value is stabilized at, or approximately at, zero towards C. P. platinum. In particular the percentage of gold in such platinum alloy wires should remain below about 5% and the percentages of other metals, if present in more than negligible quantities, should not exceed about 15%, while the platinum content in all cases should constitute a major portion of the alloy.

What I claim is:

1. A thermocouple wire consisting of an alloy of platinum and gold, wherein the gold content does not exceed approximately 5%.

2. A thermocouple wire consisting of an alloy composed of platinum constituting a major portion and gold constituting a minor portion and being not in excess of about 6%, the E. M. F. of said wire being approximately zero at 1200° C. against chemically pure platinum.

3. A thermocouple wire consisting of an alloy of platinum with gold, wherein the gold content does not fall below 0.2% and does not exceed approximately 6%.

JOHANN S. STREICHER.